Patented Dec. 6, 1927.

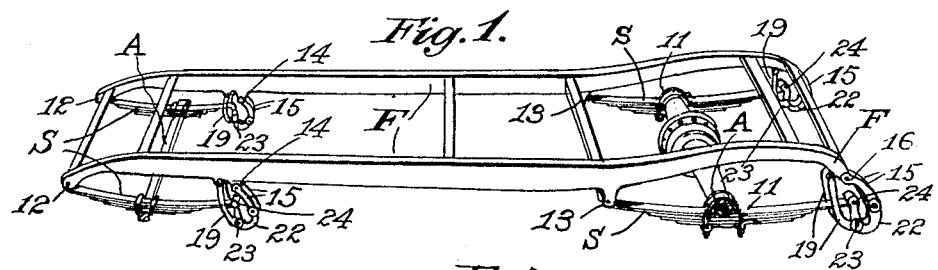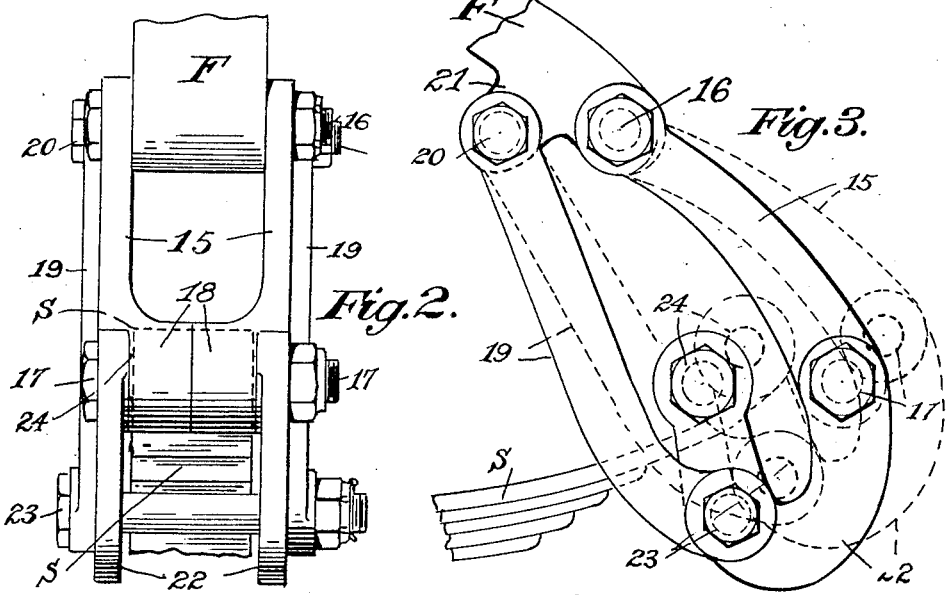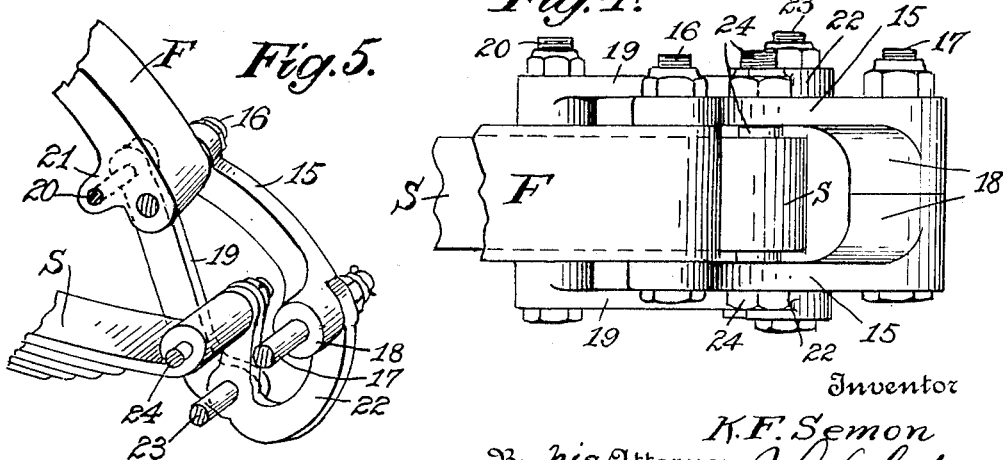

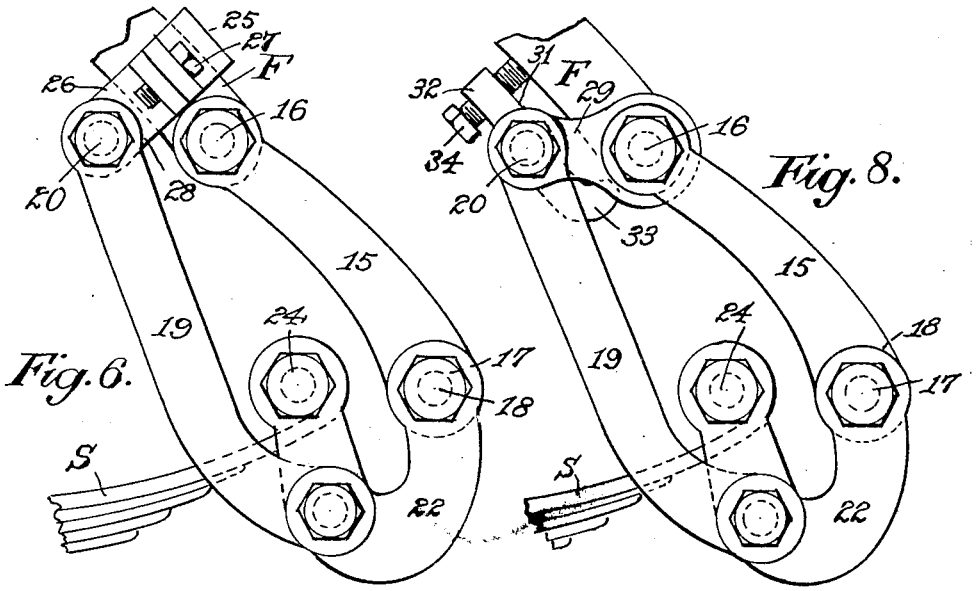
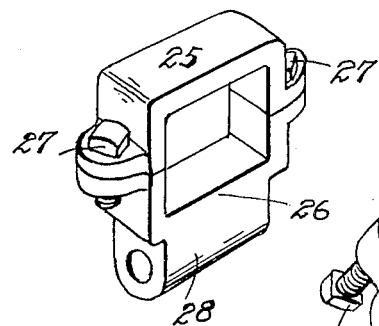
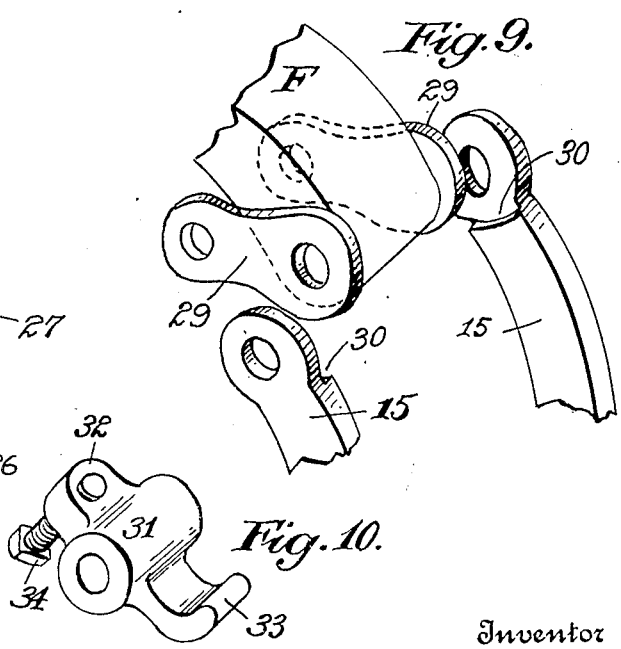

1,651,475

UNITED STATES PATENT OFFICE.

KARL F. SEMON, OF EAST ORANGE, NEW JERSEY.

SHOCK-ELIMINATING VEHICLE SUSPENSION.

Application filed December 15, 1924. Serial No. 755,981.

This invention relates to suspensions for vehicles to permit of movement between the running gear and vehicle frame, one toward and away from the other, in which the connection of the running gear with the frame includes a spring or springs, and it is the object of the invention to provide an improved vehicle suspension wherein the usual shocks transmitted from the running gear to the parts carried thereby in encountering and riding over an obstacle are practically eliminated by constructing and arranging the connection of the spring or springs between the running gear and frame whereby the greater portion of the movement of the running gear toward the frame is compensated for in said connection and the force of the resistance to such movement is taken up in said connection with the minimum of such force exerted as a flexing stress upon the spring or springs and a consequent elimination of a shock being transmitted to the vehicle frame by a reflexing movement of the spring.

In carrying out the embodiment of the invention illustrated in the drawings the vehicle body carrying or chassis frame is suspended from the wheel axles by springs extending transversely of the axles and anchored thereto intermediate the ends thereof, one end of the springs having a pivotal connection with the frame, and the opposite end of each spring having an interconnected linkage connection with the frame comprising two pairs of links pivotally connected to the frame, and a pair of intermediate links pivotally connected to the spring and to one pair of the first links, the other pair of links having a connection with the intermediate links intermediate the connections thereof with the spring and the other links.

In the drawings accompanying and forming a part of this specification Figure 1 is a perspective view of the suspension of a frame of a vehicle from the running gear showing an embodiment of my invention in relation thereto, only so much of the frame and running gear being shown as is essential to an understanding of the invention.

Figure 2 is an end elevation on an enlarged scale of my improved means for connecting the spring with the vehicle frame.

Figure 3 is a side elevation of the parts shown in Figure 2, showing in full lines the normal position thereof and in dotted lines the position the parts will assume when the running gear encounters an obstacle and movement imparted thereto toward the frame.

Figure 4 is a top view of the parts shown in full lines in Figure 3.

Figure 5 is a perspective view, partly broken away, of the parts shown in Figures 2, 3 and 4 to show the mounting and connection of the parts.

Figure 6 is a side elevation of the parts shown in Figure 3 showing the means for mounting the same upon vehicle frames as now constructed.

Figure 7 is a perspective view of the mounting shown in Figure 6.

Figure 8 is a side elevation of the parts shown in Figure 3 and showing an adjustable connection of the same to the frame.

Figure 9 is a perspective view with the parts disassembled to show the manner of connecting the one pair of links to the frame when utilizing the adjustable connection shown in Figure 8; and Figure 10 is a perspective view of an adjustable bracket for supporting one pair of links shown in Figure 8.

An embodiment of the invention is shown in the drawings in connection with the chassis frame of a motor vehicle (designated in a general way by F) consisting of the usual longitudinal side members and transverse connecting members, said frame as usual carrying the body, the motive power means and power transmission means to the driving means of the running gear, said frame being suspended or supported by the axles A by means of springs, in the present instance there being a pair of leaf springs S of semi-elliptical form to support the frame from each axle and said springs being anchored, as at 11, intermediate their ends to the axles. Each of the forward springs has a pivotal connection at the end of the forward ends of the side members of the frame, as at 12, while each of the rear springs has a pivotal connection 13 at the ends with the vehicle frame at a point within the ends of the vehicle frame members and forward of the rear axle.

Each of the springs at the rear ends has an interconnected linkage connection with the vehicle frame. This connection of the forward springs being with brackets 14 fixed to the vehicle frame, while the linkage connection of the rear springs is with and adjacent the rear ends of said members of the vehicle frame. This linkage connection of the springs with the frame in the embodiment thereof shown in Figures 1 to 6 comprises a pair of links 15 hung or pivotally supported at one end upon the extremities of bolts 16 engaged in openings in the rear ends of the frame for the rear springs and in the brackets 14 for the forward springs. These links are connected at the opposite ends by bolts 17 whereby one link will participate in the movement of the other upon the supporting bolt 16, and at said latter ends are arranged with laterally extending spacing bosses 18. A second pair of links 19 are pivotally supported at one end upon the opposite ends of a bolt 20 engaged in a perforation in a lug 21 arranged upon the frame members within the ends thereof and the connection of the links 15, the opposite ends of said links 19 having a pivotal connection with intermediate links 22, as by a bolt 23. The links 22 are substantially of U or yoke shape having a pivotal connection at one extremity thereof with the links 15 by the bolt 17 and the opposite ends pivotally connected to a spring by a bolt 24 engaging in an eye formed at the end of the spring and the links hung upon the ends thereof. The connection of the links 19 with the links 22 is at a point intermediate the ends thereof and arranged so that the pivotal connection of the spring with the links 22 is intermediate the links 15, 19 with the axis of the pivotal support substantially in the same horizontal plane as the axis of the pivotal connection 17 of the links 15 and 22 in the normal position thereof.

In the normal position of the parts, they will assume substantially the position indicated in full lines in Figure 3. However, as the vehicle wheels are moved in a direction toward the vehicle frame, as in the encountering of and riding over an obstacle due to the force of the resistance of the vehicle frame to such movement of the wheel axle this movement of the axle will be compensated for by the spring moving with the axle toward the frame and without imparting participating movement to the vehicle frame, the parts assuming substantially the position indicated in dotted lines in said Figure 3. The engagement of the shoulders 15' between the links 15, 22, causes said links to move in said direction as a unit on the bolt 16. Furthermore, the force of the resistance of the frame and the movement of the spring with the axle is also taken up in the link connection with a minimum of such force exerted upon the spring as a flexing strain and stress. This is due to the particular construction and arrangement of the link connection. The resistance force of the frame to the spring and axle which tends to exert a flexing stress upon the spring and a consequent elongation thereof exerts a force through the connection 24 of the spring with the links 22 to move the links about the connection 23 which is yieldingly resisted by the connection 18 of said links with the links 15 with the result that the movement of the spring with the axle and a minimum flexing movement thereof will move the links 15, 22 and the connection thereof to the position shown in dotted lines in Figure 3, and this latter movement of the links 15, 22 being in turn yieldingly resisted by the links 19 through the connection 23 of said links with the links 22. By this arrangement there will be a minimum flexing of the spring and practically no reflexing movement of the spring with the result that the shock of such reflexing movement of the spring imparted to the vehicle frame in the present commercial form of vehicle spring suspensions is practically eliminated.

In Figure 6 there is illustrated an embodiment of the invention applied to the present commercial forms of vehicle frames where the frames are not provided with the lug 21. To connect the links 19 with the frame there is provided a supporting bracket for said links to be mounted upon the vehicle frame, said bracket comprising a pair of opposite U-shaped members 25, 26 (Figure 7) to be engaged about the frame member and clamped thereto by bolts passing through perforated lugs extending laterally from said members, as at 27. The clamping member 26 is arranged with a perforated lug 28 for the engagement of the supporting bolt 20 for the links 19.

In Figures 8, 9 and 10 there is shown an adjustable connection for the links 19 with the frame, comprising a pair of links 29 engaged upon the supporting bolt 16 for the links 15, the ends of the links 15 having a portion cut away at the ends, as at 30 (Figure 9) to form recesses for the engagement of the links 29. The supporting bolt 20 for the links 19 is engaged in perforations in the opposite ends of the links 29 and an interposed bracket 31 (Figure 10) having oppositely extending projections 32, 33 the extremity of the projection 33 being curved and adapted for the engagement of the frame, while the opposite projection has a threaded perforation for the adjustable engagement of an abutment to engage with the frame in the form of a set-screw 34.

While the invention has been described and illustrated in connection with a vehicle suspension wherein the springs extend transversely of and are anchored to a wheel axle, and the invention applied to the connection of one end of the spring with the vehicle frame, it will be obvious that the linkage arrangement may be applied to both ends of the spring, as where the spring is anchored to the vehicle frame, to serve as the connection of the spring with the vehicle axle. It will also be obvious that various modifications may be made in the construction and arrangement of parts and come within the scope of the invention.

Having thus described my invention I claim:

1. In a vehicle suspension, a spring fixed to a wheel axle and having a link connection with the vehicle frame arranged to compensate for the movement between the axle and frame and co-operate with the spring to take up the force of the resistance to such movement with the minimum of such force exerted as a flexing stress on the spring comprising two pairs of links pivotally connected with the frame, and an intermediate pair of links pivotally connected at one end to the spring and at the other end to a pair of the first links and the other pair of first links having pivotal connection with the intermediate links intermediate the connections thereof with the spring and other links.

2. In a vehicle suspension, a spring fixed to a wheel axle and having a link connection with the vehicle frame arranged to compensate for the movement between the axle and frame and co-operate with the spring to take up the force of the resistance to such movement with the minimum of such force exerted as a flexing stress on the spring, comprising two pairs of links, each pair of links having a pivotal connection at one end with the frame, and a pair of substantially U-shaped intermediate links pivotally connected at one end to the spring and at the opposite end with a pair of the first links, the other pair of the first links having a pivotal connection with said intermediate links intermediate the connections thereof with the spring and other links.

3. In a vehicle suspension, a spring fixed to a wheel axle and having a link connection with the vehicle frame arranged to compensate for the movement between the axle and frame and co-operate with the spring to take up the force of the resistance to such movement with the minimum of such force exerted as a flexing stress on the spring, comprising two pairs of links, one pair of said links having a fixed pivotal connection at one end with the frame and the other pair of links having an adjustable pivotal connection with the frame, and an intermediate pair of links connected at one end with the spring and at the other end with the first pair of links having a fixed pivotal connection with the frame, and the other pair of the first links having a pivotal connection with the intermediate links intermediate the connections thereof with the spring and other links.

4. In a vehicle suspension, a spring fixed to a wheel axle and having a link connection with the vehicle frame arranged to compensate for the movement between the axle and frame and co-operate with the spring to take up the force of the resistance to such movement with the minimum of such force exerted as a flexing stress on the spring, comprising a pair of links having a fixed pivotal connection with the frame, a bracket on the frame, a second pair of links pivotally connected to said bracket, a pair of intermediate links pivotally connected at one end with the spring and at the opposite end with the links having a pivotal fixed connection with the frame, and the other pair of links having a pivotal connection with the intermediate links intermediate the connections thereof with the spring and other links.

5. In a vehicle, the combination with the frame and running gear, of means to connect the frame and running gear to have movement relative to and away from each other, comprising a spring connected intermediate its ends to one of said parts, a link pivotally connected at one end to the spring and the other end to a connection link which is pivotally connected to a fixed part, and means pivotally connected intermediate the ends of the first link and a fixed part to hold the first link and spring.

Signed at the city of New York, in the county of New York and State of New York, this 5th day of December, 1924.

KARL F. SEMON.